(12) United States Patent
Orlamünder et al.

(10) Patent No.: US 10,690,218 B2
(45) Date of Patent: Jun. 23, 2020

(54) TORSIONAL VIBRATION DAMPING ASSEMBLY FOR A DRIVE TRAIN OF A VEHICLE

(71) Applicant: ZF Friedrichshafen AG, Friedrichshafen (DE)

(72) Inventors: Andreas Orlamünder, Schonungen (DE); Daniel Lorenz, Bad Kissingen (DE); Thomas Dögel, Nuedlingen (DE); Kyrill Siemens, Wuerzburg (DE); Erwin Wack, Niederwerrn (DE); Tobias Dieckhoff, Wuerzburg (DE); Markus Terwart, Thundorf (DE); Matthias Reisch, Ravensburg (DE); Matthias Arzner, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 57 days.

(21) Appl. No.: 16/070,792

(22) PCT Filed: Dec. 19, 2016

(86) PCT No.: PCT/EP2016/081658
§ 371 (c)(1),
(2) Date: Jul. 18, 2018

(87) PCT Pub. No.: WO2017/125221
PCT Pub. Date: Jul. 27, 2017

(65) Prior Publication Data
US 2019/0032748 A1    Jan. 31, 2019

(30) Foreign Application Priority Data
Jan. 22, 2016 (DE) .................... 10 2016 200 888

(51) Int. Cl.
*F16F 15/16* (2006.01)
*F16F 15/02* (2006.01)
(Continued)

(52) U.S. Cl.
CPC .............. *F16F 15/02* (2013.01); *F16F 7/104* (2013.01); *F16F 15/161* (2013.01); *F16F 15/162* (2013.01); *F16F 15/20* (2013.01)

(58) Field of Classification Search
CPC .......... F16F 7/104; F16F 15/02; F16F 15/161; F16F 15/162; F16F 15/20
See application file for complete search history.

(56) References Cited

U.S. PATENT DOCUMENTS 7,993,204 B2 *   8/2011   Dogel ................ F16F 15/16
                                                       464/27
2006/0247065 A1 * 11/2006  Bach ................. F16D 3/12
                                                       464/68.3
(Continued)

FOREIGN PATENT DOCUMENTS

DE    102006061342    6/2008
DE    102008015817    10/2009
(Continued)

*Primary Examiner* — Bradley T King
(74) *Attorney, Agent, or Firm* — Cozen O'Connor (57) ABSTRACT

A torsional vibration damping arrangement for a drivetrain of a vehicle comprises a rotational mass arrangement which is rotatable around a rotational axis A and a damping arrangement fixed with respect to rotation relative to the rotational axis A. A displacer unit is operatively connected to the primary inertia element on the one side and to the secondary inertia element on the other side. The damping arrangement includes a slave cylinder with a working chamber having a volume V2, and the working chamber of the slave cylinder is operatively connected to the working chamber of the displacer unit. The damping arrangement includes a stiffness arrangement and a damper mass, and the (Continued)

slave cylinder of the damping arrangement is operatively connected to the damper mass by a stiffness arrangement.

12 Claims, 6 Drawing Sheets

(51) Int. Cl.
    *F16F 15/20*      (2006.01)
    *F16F 7/104*      (2006.01)

(56) References Cited

U.S. PATENT DOCUMENTS

| | | | |
|---|---|---|---|
| 2009/0127040 A1* | 5/2009 | Busold | F16F 15/165 |
| | | | 188/269 |
| 2009/0133529 A1* | 5/2009 | Kister | F16F 15/162 |
| | | | 74/573.11 |
| 2010/0043593 A1* | 2/2010 | Carlson | F16F 15/162 |
| | | | 74/573.11 |
| 2010/0090382 A1 | 4/2010 | Carlson | |
| 2014/0196568 A1* | 7/2014 | Pietron | F16F 7/1005 |
| | | | 74/574.2 |
| 2019/0024753 A1* | 1/2019 | Orlamunder | F16F 15/162 |

FOREIGN PATENT DOCUMENTS

| | | |
|---|---|---|
| DE | 102008017402 | 10/2009 |
| WO | WO2010031740 | 3/2010 |

* cited by examiner

TORSIONAL VIBRATION DAMPING ASSEMBLY FOR A DRIVE TRAIN OF A VEHICLE

PRIORITY CLAIM

This is a U.S. national stage of application No. PCT/EP2016/081658, filed on Dec. 19, 2016. Priority is claimed on the following application: Country: Germany, Application No.: 10 2016 200 888.9, filed: Jan. 22, 2016, the content of which is/are incorporated in its entirety herein by reference.

FIELD OF THE INVENTION

The present invention is directed to a torsional vibration damping arrangement for a drivetrain of a vehicle, comprising a primary side to be driven in rotation around a rotational axis and a secondary side which is coupled with the primary side via a working medium for rotation around the rotational axis and for relative rotation with respect to one another.

BACKGROUND OF THE INVENTION

A torsional vibration damping arrangement of this kind is known from US published application US-2010-0090382-A1. This known torsional vibration damping arrangement has a primary side and a secondary side which is coupled with the primary side via a damper fluid arrangement for rotation around a rotational axis and for relative rotation with respect to one another. The damper fluid arrangement comprises in a first damper fluid chamber arrangement a first damper fluid with less compressibility which transmits a torque between the primary side and the secondary side and comprises in a second damper fluid chamber arrangement a second damper fluid which has greater compressibility and which is loaded during a pressure increase of the first damper fluid in the first damper fluid chamber arrangement. The second damper fluid chamber arrangement comprises a plurality of preferably substantially cylindrical chamber units which are arranged radially outwardly and/or radially inwardly with respect to the first damper fluid chamber arrangement and successively in circumferential direction. A separating element which separates the first damper fluid from the second damper fluid and which is substantially radially displaceable when there is a change in pressure in the chamber unit is associated with each chamber unit. The advantage of this vibration reducing system consists in that the stiffness can be adjusted substantially as low as required, which enables a very good decoupling of the torsional vibrations of the internal combustion engine. However, the disadvantage is that the torsional vibrations cannot be reduced sufficiently in a simple coupled oscillator in spite of the lowest possible stiffness because, even when reduced to close to zero, a side shaft stiffness in the vehicle associated with the rest of the drivetrain defines the vibrational behavior of the entire drivetrain.

It is thus an object of the present invention to provide a torsional vibration damping arrangement for a drivetrain in a vehicle with which an efficient reduction of torsional vibrations in the torque transmitted in a drivetrain can be achieved in a compact construction and with a low mass moment of inertia.

SUMMARY OF THE INVENTION

According to the invention, this object is met through a torsional vibration damping arrangement for a drivetrain of a vehicle, comprising a rotational mass arrangement rotatable around a rotational axis A and a damping arrangement which is arranged outside of the rotational mass arrangement and which is operatively connected to the rotational mass arrangement and fixed with respect to rotation relative to the rotational axis A. The rotational mass arrangement comprises a primary inertia element which is rotatable around the rotational axis A and a secondary inertia element which is rotatable relative to the primary inertia element and comprises a displacer unit. The displacer unit is operatively connected to the primary inertia element on the one side and to the secondary inertia element on the other side. The displacer unit comprises a working chamber, and a volume V1 of the working chamber is changed through a relative rotation of the primary inertia element with respect to the secondary inertia element out of a neutral position. The damping arrangement comprises a slave cylinder with a working chamber having a volume V2, and the working chamber of the slave cylinder is operatively connected to the working chamber of the displacer unit. The damping arrangement comprises a stiffness arrangement and a damper mass, and the slave cylinder of the damping arrangement is operatively connected to the damper mass by a stiffness arrangement. By separating the rotational mass arrangement, i.e., the rotating system, and the damping arrangement, i.e., the system which is fixed with respect to relative rotation, the rotational mass arrangement can be constructed in a compact manner and consequently with a low mass moment of inertia, which can have an advantageous outcome for a spontaneous response behavior of the drive unit. The displacer unit can be formed, for example, from a tangentially arranged pressure cylinder or a rotary piston displacer such as a vane displacer or a gearwheel displacer. Vane displacers have a finite rotational angle, and gearwheel displacers have an infinite rotational angle. The torsional vibration damping arrangement functions in the following manner: a torque with torsional vibrations contained therein is conveyed to the primary mass inertia by a drive unit, especially an internal combustion engine. When the torque with the torsional vibrations contained therein is transmitted to the secondary mass inertia, the displacer unit, especially comprising a housing element, a displacer piston and a working chamber with a volume V1, converts the torque especially into fluid pressure when a liquid is used as working medium. The fluid pressure is conveyed via a connection line and a rotary feedthrough from the rotating rotational mass arrangement to the damping arrangement which is fixed with respect to relative rotation, more precisely in this instance to a slave cylinder comprising most particularly a housing element, a displacer piston and a working chamber with a volume V2. The slave cylinder can be connected to a damper mass via a stiffness arrangement. The fluid pressure now causes the displacer piston to be moved in the working direction of the fluid pressure. Because the displacer piston is in turn connected to the damper mass via the stiffness arrangement, an oppositely phased damping of the torsional vibrations is carried out depending on tuning, and the torsional vibrations are at least partially eliminated. Further, a supply pump such as an oil pressure pump and a pressure storage can be connected to the fluid pressure to carry out leakage compensation on the one hand or, by way of a pressure change, to achieve a load point adjustment and, therefore, an active superposition of a periodic pressure characteristic. This requires a control device and a regulating device to be operatively connected to the fluid pressure.

A further advantageous embodiment provides that the stiffness arrangement of the damping arrangement has an energy storage, and the energy storage is an elastically deformable element or a pneumatically compressible element. A steel spring, for example, can be used as elastically deformable element, or a nitrogen oxide gas can be used, for example, in a gas spring as pneumatically compressible element. The gas spring is advantageous in this regard because its force-deflection characteristic is progressive and has a variable stiffness through the deflection.

A further advantageous embodiment provides that a working medium comprising a viscous medium, or a gas, or a combination of a viscous medium and a gas is located in the working chamber of the displacer unit and in the working chamber of the slave cylinder. In this regard, a viscous medium such as a hydraulic fluid, for example, is especially advantageous because liquids are not compressible and are advantageously suitable as working medium for conveying in the form of pressure pulses. Accordingly, the alternating torques from the drive unit which are converted by the displacer unit to alternating pressures can be conveyed directly to the slave cylinder via the working medium, i.e., a hydraulic fluid in this case. Since the slave cylinder is in turn operatively connected to the damper mass arrangement, an advantageous reduction of vibrations can be achieved in this way.

In a further advantageous configuration, the rotational mass arrangement comprises a fixed stiffness with an energy storage, and the primary inertia element is rotatable relative to the secondary inertia element against the action of the energy storage. A gas spring or an elastically deformable element such as a steel spring, a plastic spring or a known comparable elastically deformable element can be used as energy storage.

The energy storage which is installed between the primary inertia element and the secondary inertia element can be arranged in parallel with or in series with the displacer unit.

As has already been described above, an elastically deformable element or a pneumatically compressible element can be used as energy storage of the stiffness arrangement which is arranged between the primary inertia element and the secondary inertia element.

A further embodiment provides that the working chamber of the displacer unit is operatively connected to a working chamber of the slave cylinder by a connection line. The connection line is constructed such that it receives the working medium, i.e., the liquid or the gas or a combination of liquid and gas, with low pumping loss. This means that the alternating pressures of the working medium should not cause an elastic deformation of the connection line, which could have disadvantageous consequences for the control behavior of the damper mass arrangement and can therefore also be disadvantageous for vibration damping.

In a further advantageous configuration, the connection line comprises a rotary feedthrough which connects the working chamber of the displacer unit, which working chamber is rotatable around the rotational axis A, and the working chamber of the slave cylinder, which working chamber is fixed with respect to rotation relative to the rotational axis A, so as to be liquid-tight and/or gas-tight and so as to be rotatable with respect to one another.

Further, it may be advantageous that the damping arrangement comprises a supply pump and/or a pressure storage and/or a control unit, and the supply pump and/or the pressure storage and/or the control unit is operatively connected to the working chamber of the slave cylinder. This can be advantageous, for one, in order to compensate for leakage and/or to achieve a load point shift of the damper mass arrangement. To this end, the pressure of the working medium can be changed through the supply pump and the pressure storage. The control unit which can control the needed pressure of the working medium can also be advantageous for this purpose. The supply pump can advantageously be an oil pressure pump or a compressor. The control unit advantageously includes sensors for detecting pressure, pressure control valves and pressure switching valves.

Further, the slave cylinder can have a load spring element, and the load spring element acts against a working direction of a volume change V2 of the working chamber of the slave cylinder. This can make possible an additional shift of the operating point of the effective damper stiffness by increasing the fluid pressure of the working medium in the displacer unit and in the slave cylinder against the load spring. This load spring can be constructed as a steel spring or also as a gas spring. Through the alternating torque at the displacer, the damper mass arrangement which is fixed with respect to rotation relative to rotational axis A and which comprises the damper mass and the damper stiffness arrangement is excited via the alternating pressure on the slave cylinder. With suitable tuning, the damper mass arrangement operates in phase opposition and accordingly at least partially cancels the vibrations.

In a further advantageous embodiment, the rotational mass arrangement includes a damper subassembly which is operatively connected to the primary inertia element or to the secondary inertia element. The damper subassembly can be constructed as a pendulum in the centrifugal force field. This can be constructed according to the known Salomon principle. However, a mass pendulum based on the known Sarazin principle or any functionally suitable mass pendulum can also be used. In principle, known Salomon type or Sarazin type mass pendulums function identically. These may also be referred to as a Sarazin type absorber and a Salomon type absorber. Both mass pendulums are based on the principle of mass displacement relative to its carrier part due to changing rates of rotation. The Salomon type absorber is more advantageous with respect to the radial installation space requirement. A further advantage of the Salomon type absorber consists in the ease with which the tuning order is adapted through an appropriate design of a path geometry of the mass pendulum movement. In addition, in the case of the Sarazin type absorber the center of gravity radius of the mass body must be changed, e.g., by means of a spring-mounted mass which moves radially outward with increasing speed. However, any other type of construction of centrifugal force pendulum can be used, for example, a deflection mass pendulum unit comprising a deflection mass and an elastic restoring element with or without variable clamping length, where this clamping length can also vary under the influence of centrifugal force.

BRIEF DESCRIPTION OF THE DRAWINGS

The present invention will be described in detail in the following with reference to the accompanying figures, in which.

DETAILED DESCRIPTION OF THE PRESENTLY PREFERRED EMBODIMENTS

Figure 1:
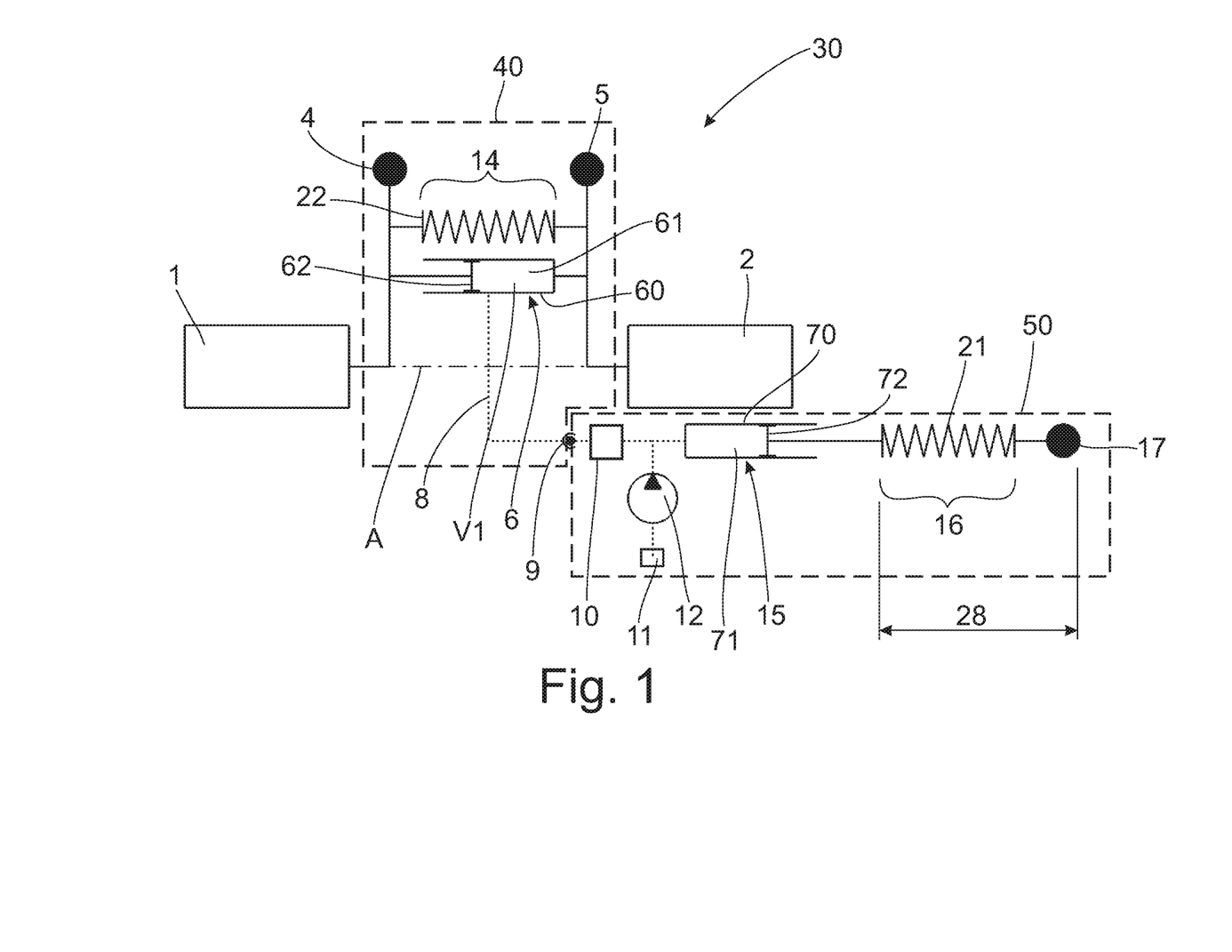
FIG. 1 shows a torsional vibration damping arrangement with a rotational mass arrangement and damping arrangement.
Figure 1A:
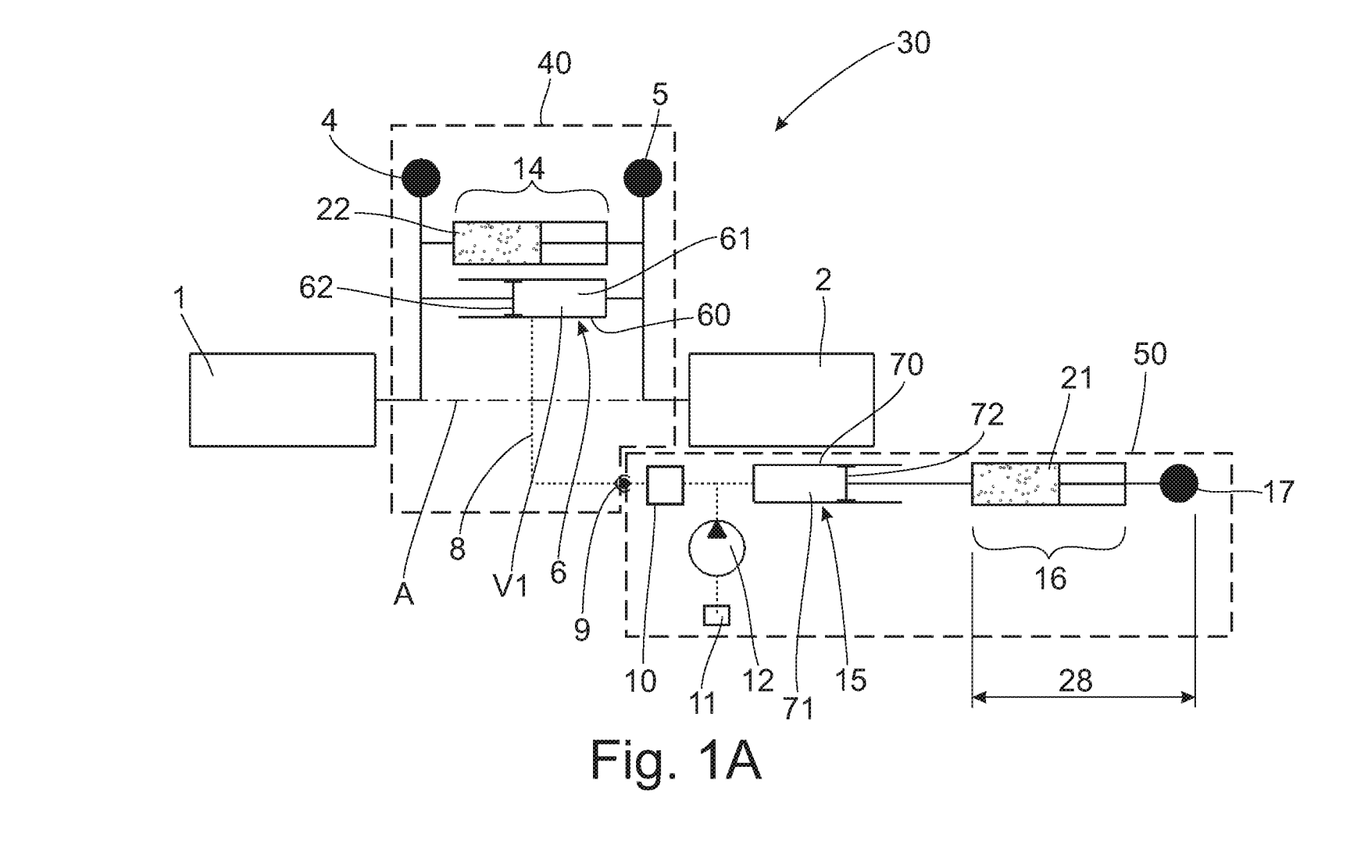
FIG. 1A shows the torsional vibration damping arrangement as in FIG. 1, but with the stiffness arrangement and the energy storage constructed as pneumatically compressible elements.

FIG. 1 shows a torsional vibration damping arrangement 30 which is installed between a drive unit 1 and a transmission unit 2. In the present case, the torsional vibration damping arrangement 30 principally comprises a rotational mass arrangement 40 which is rotatable around the rotational axis A and a damping arrangement 50 which is not rotatable around rotational axis A but, rather, is positioned in a stationary manner, for example, in a trunk compartment of a motor vehicle, not shown. The rotational mass arrangement 40 in the present instance comprises a primary inertia element 4 and a secondary inertia element 5 which are both rotatable relative to one another opposite the working direction of a displacer unit 6 and a fixed stiffness 14 connected in parallel with the latter. The fixed stiffness 14 in FIG. 1 is an energy storage 22 formed by an elastically deformable element 22 such as a steel spring; while FIG. 1A shows the energy storage as a pneumatically compressible element.

In this instance, the displacer comprises, inter alia, a housing element 60, a displacer piston 62 and a working chamber with a volume V1. The displacer piston 62 is connected to the primary inertia element 4, and the housing element 60 is connected to the secondary inertia element 5. When the primary inertia element 4 rotates relative to the secondary inertia element 5, the displacer piston 62 moves into the working chamber 61 and displaces a working medium 63 in the working chamber 61, especially a fluid such as hydraulic oil, or a gas, or a combination of hydraulic oil and gas. The displaced working medium 63 is conveyed through a connection line 8 connected to the working chamber 61 of the displacer unit 6 to a working chamber 71 with a volume V2 of a slave cylinder 15 of the damping arrangement 50. The connection line 8 is divided by a rotary feedthrough 9 into a rotatable part and a stationary part, since the displacer unit 6 is rotatable around rotational axis A but the slave cylinder 15 is stationary and is therefore not rotatable around rotational axis A. In this case, the slave cylinder comprises, inter alia, a housing element 70 and a displacer piston 72. The displacer piston 72 is connected to a damper mass 17 by a stiffness arrangement 16 which is constructed in this instance as an energy storage 21 in the form of a steel spring. This arrangement of stiffness arrangement 16 and damper mass may also be referred to as a damper mass arrangement 28, in this instance in the form of a fixed frequency absorber. If the working medium is displaced in working chamber 61, this working medium reaches working chamber 71 of slave cylinder 15 via connection line 8 and displaces the displacer piston 72 which in turn controls the damper mass arrangement 28. This arrangement is particularly advantageous because the actual absorber function is transferred away from the rotating rotational mass arrangement so that the mass moment of inertia of the rotational mass arrangement can be kept small, which in turn can advantageously affect a spontaneous response behavior of the drive unit.

A supply pump 12, for example, an oil pressure pump or a compressor, provides for leakage compensation or also for an active superposition of a periodic pressure characteristic which preferably acts in phase opposition. However, this requires a control device 10 which is operatively connected to working medium and can influence the pressure of the working medium.

Figure 2:
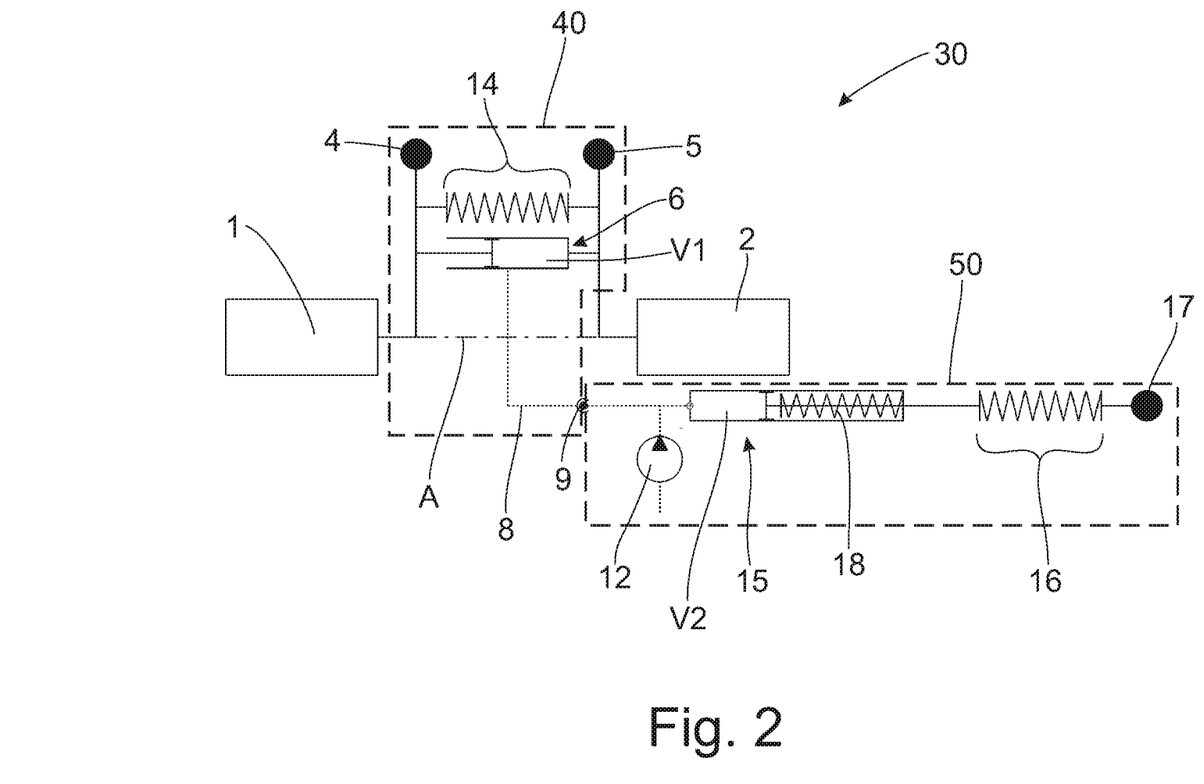
FIG. 2 shows a torsional vibration damping arrangement as in FIG. 1, but with a load spring in the slave cylinder.

FIG. 2 shows a torsional vibration damping arrangement 30 such as that shown in FIG. 1, but with a load spring 18 which acts on the displacer piston 72 opposite the working direction of working medium in working chamber 71 of slave cylinder 15. The load spring 18 can be constructed as an elastically deformable element, for example, a steel spring, shown here, or as a gas spring, shown in FIG. 1A.

In this way, an additional shifting of the operating point of the active stiffness arrangement 16 of the damper mass 17 can be achieved by changing an operative pressure of the working medium against the load spring 18 through the supply pump 12. When an alternating torque brought about by the drive unit 1, especially an internal combustion engine, comes to bear on the rotational mass arrangement 40, this alternating torque is transformed at the displacer unit 6 into an alternating pressure and is transmitted to the slave cylinder 15 which in turn excites the damper mass arrangement 28 which, in the present case, comprises the stiffness arrangement 16 and the damper mass 17. When suitably tuned, the damper mass arrangement 28 acts in phase opposition and accordingly at least partially cancels the vibrations.

Figure 3:
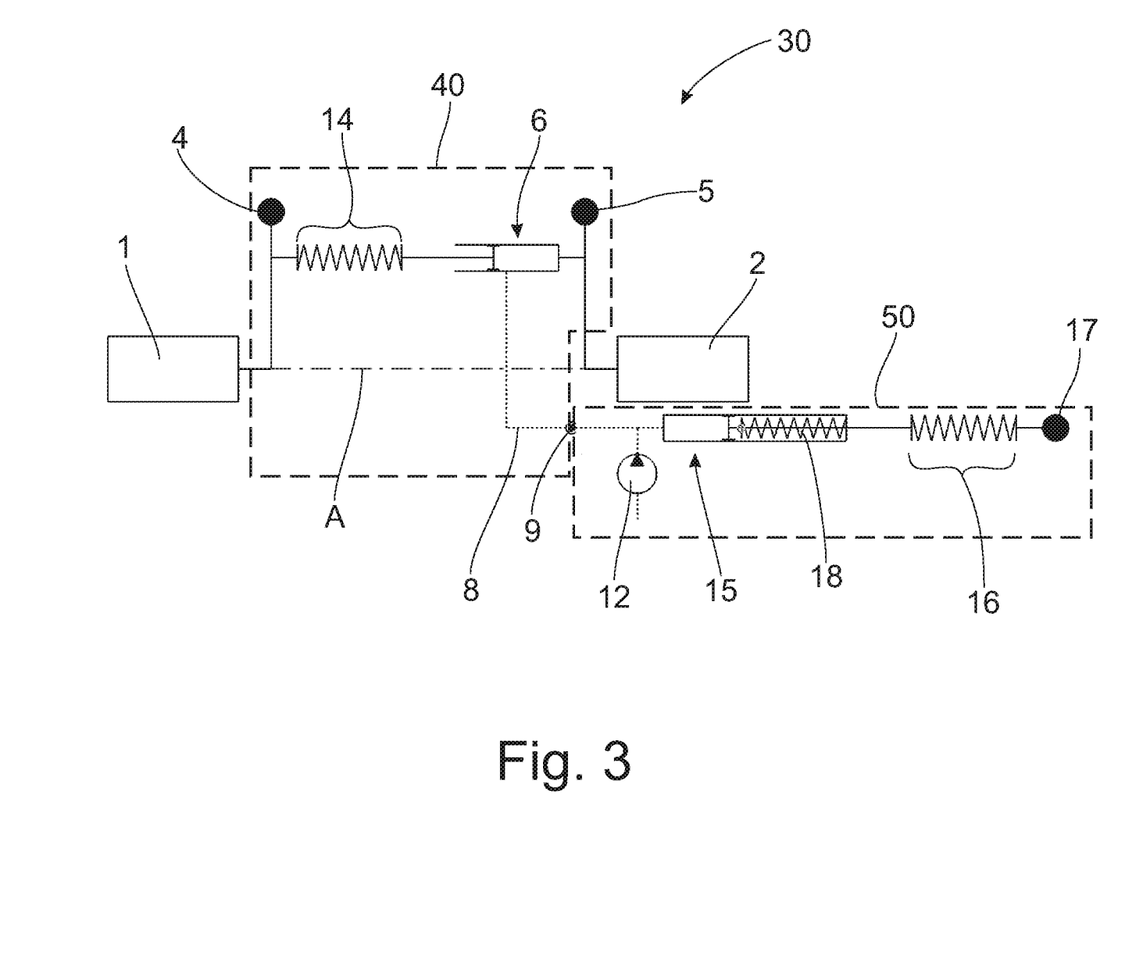
FIG. 3 shows a torsional vibration damping arrangement as in FIG. 2, but with displacer unit and fixed stiffness connected in series.

FIG. 3 shows a torsional vibration damper arrangement 30 such as that shown in FIG. 2, but with displacer unit 6 and fixed stiffness 14 connected in series. As a result of the series connection of the displacer unit 6 to the fixed stiffness 14, the damper mass arrangement 28 comprising the stationary system has a cancelling effect on the alternating torque which is introduced via the fixed stiffness 14. The supply pump 12, constructed in this case particularly as an oil pressure pump, serves to compensate for leakage or for actively superposing a periodic pressure characteristic which preferably acts in phase opposition. In this case also, it is possible to shift the operating point because the slave cylinder 15 has a load spring element 18.

Figure 4:
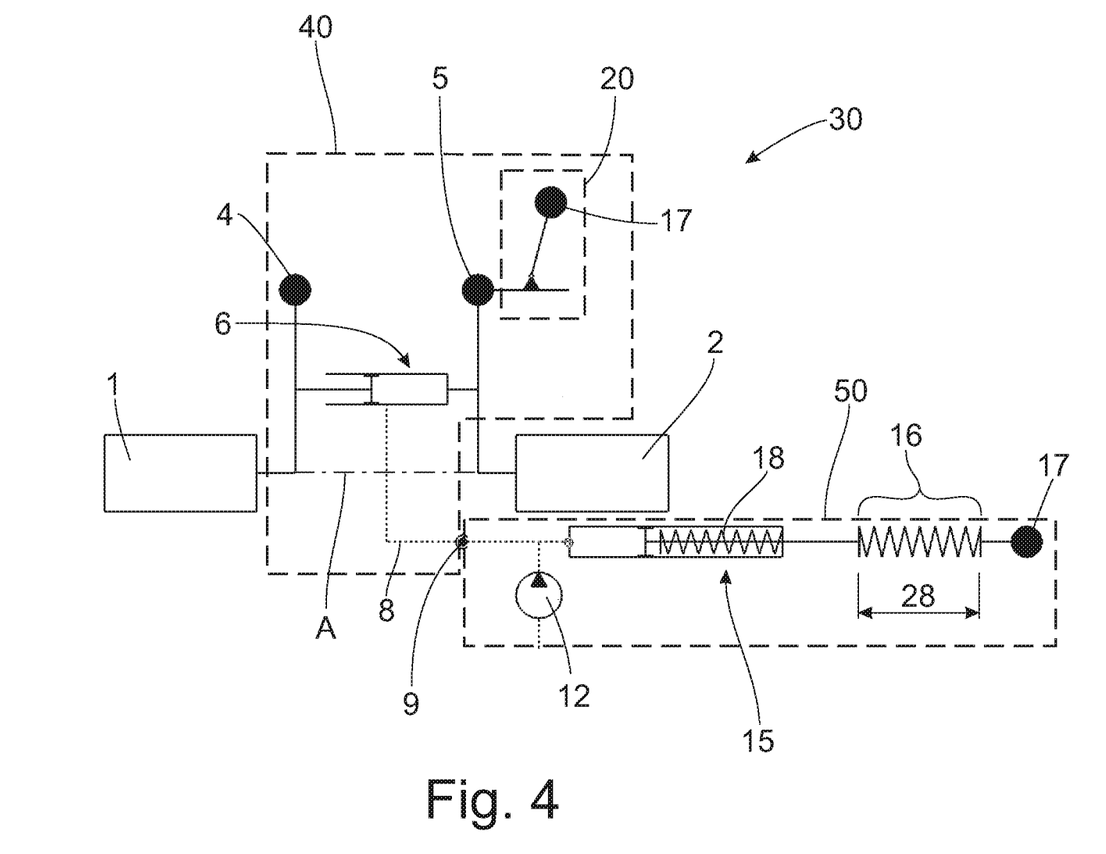
FIG. 4 shows a torsional vibration damping arrangement as in FIG. 3, but without the fixed stiffness and with a centrifugal pendulum.
Figure 4A:
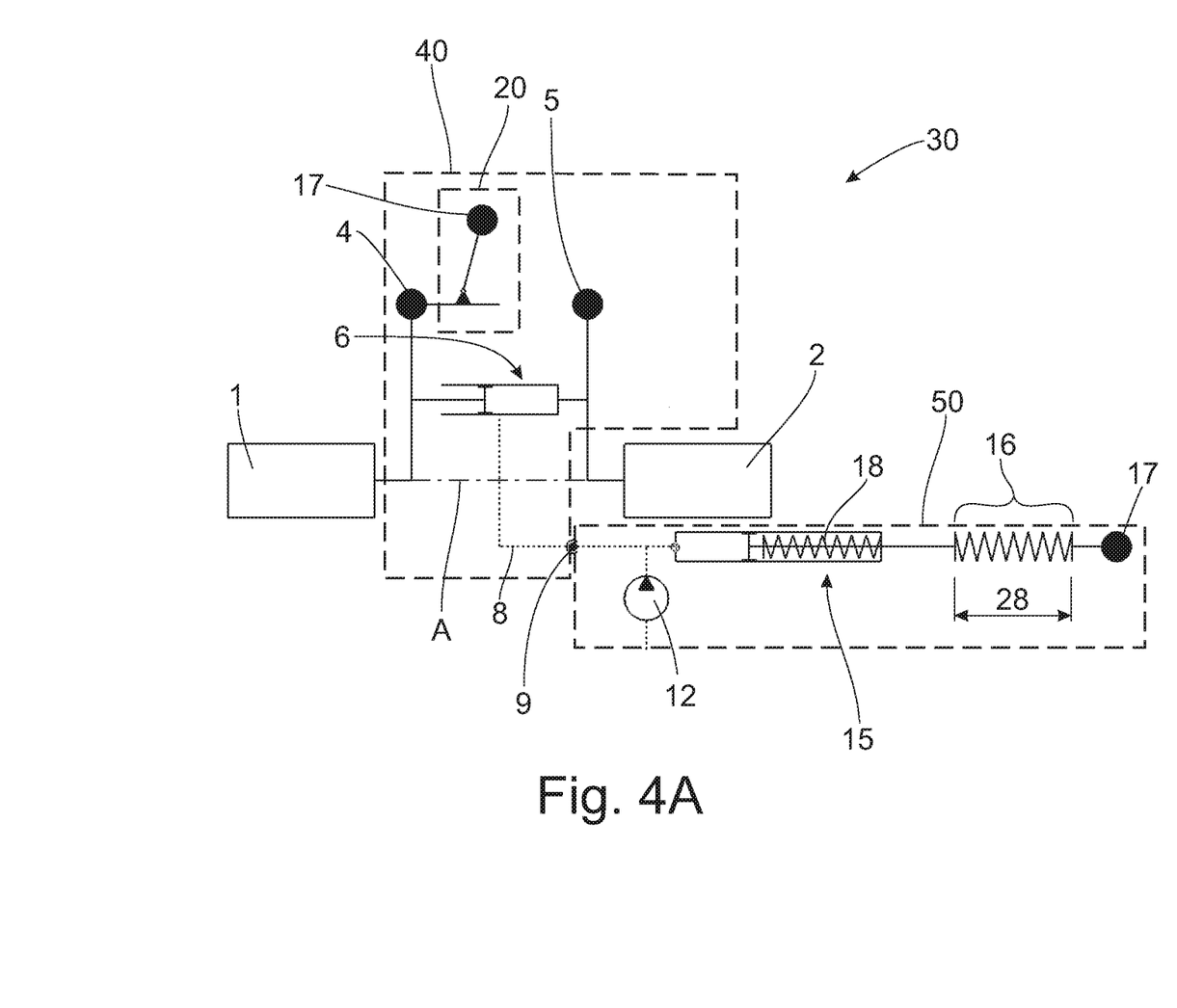
FIG. 4A shows a torsional vibration damping arrangement as in FIG. 4, but with the damper assembly connected to the primary inertia element.

FIG. 4 shows a torsional vibration damping arrangement 30 such as that shown in FIG. 3, but with only the displacer 6 between the primary inertia element 4 and the secondary inertia element 5, that is, without the fixed stiffness 14 but with a damper subassembly 20 at the secondary inertia element 5, the damper subassembly 20 being constructed in this instance as a centrifugal pendulum. FIG. 4A shows the damper assembly 20 connected to the primary inertia element 4. These embodiments are intended to be only exemplary. All known centrifugal pendulums as well as fixed frequency absorbers comprising a stiffness and a mass are suitable for this purpose. Also in this embodiment, a damper mass 17 which is fixed with respect to rotation relative to the rotational axis A and which has a stiffness arrangement 16 is arranged at the slave cylinder 15. The damper mass 17 imparts an opposite-phase pressure characteristic to the stiffness of the load spring element 18 and at least partially cancels the vibrations. When suitably tuned, for example, to the main order of excitation or frequency of the drive unit 1, in this case the internal combustion engine, the resources expended on control for the system are minimal. As a result of a low stiffness, a smaller damper mass of the damper subassembly can be selected because the pre-decoupling through the external spring 18 is excellent owing to the low stiffness.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A torsional vibration damping arrangement for a drivetrain of a vehicle, comprising:
   a rotational mass arrangement rotatable around a rotational axis A;
   a damping arrangement arranged outside of the rotational mass arrangement and operatively connected to the rotational mass arrangement and fixed with respect to rotation relative to the rotational axis A; the rotational mass arrangement comprising a primary inertia element rotatable around the rotational axis A and a secondary inertia element rotatable relative to the primary inertia element and further comprising a displacer unit, operatively connected to the primary inertia element on one side thereof and to the secondary inertia element on another side thereof, wherein the displacer unit comprising a working chamber, and wherein a volume V1 of the working chamber is changed through a relative rotation of the primary inertia element with respect to the secondary inertia element out of a neutral position;
   the damping arrangement further comprising a slave cylinder with a working chamber having a volume V2, the working chamber of the slave cylinder operatively connected to the working chamber of the displacer unit; the damping arrangement comprising a stiffness arrangement and a damper mass, and wherein the slave cylinder of the damping arrangement is operatively connected to the damper mass by the stiffness arrangement.

2. The torsional vibration damping arrangement according to claim 1, wherein the stiffness arrangement of the damping arrangement comprises an energy storage constructed as an elastically deformable element or a pneumatically compressible element.

3. The torsional vibration damping arrangement according to claim 1, wherein a working medium comprising a viscous medium, or a gas, or a combination of a viscous medium and a gas is located in the working chamber of the displacer unit and in the working chamber of the slave cylinder.

4. The torsional vibration damping arrangement according to claim 1, wherein the rotational mass arrangement comprises a fixed stiffness with an energy storage, and wherein the primary inertia element is rotatable relative to the secondary inertia element against the action of the energy storage.

5. The torsional vibration damping arrangement according to claim 4, wherein the energy storage is arranged in parallel with or in series with the displacer unit.

6. The torsional vibration damping arrangement according to claim 4, wherein the energy storage is an elastically deformable element or a pneumatically compressible element.

7. The torsional vibration damping arrangement according to claim 1, wherein the working chamber of the displacer unit is operatively connected to a working chamber of the slave cylinder by a connection line.

8. The torsional vibration damping arrangement according claim 7, wherein the connection line comprises a rotary feedthrough connecting the working chamber of the displacer unit, and the working chamber of the slave cylinder, so as to be liquid-tight and/or gas-tight so that the working chamber of the displacer unit is rotatable with respect to the working chamber of the slave cylinder.

9. The torsional vibration damping arrangement according to claim 1, wherein the damping arrangement comprises a supply pump and/or a pressure storage and/or a control unit, and wherein the supply pump and/or the pressure storage and/or the control unit are/is operatively connected to the working chamber of the slave cylinder.

10. The torsional vibration damping arrangement according to claim 1, wherein the slave cylinder comprises a load spring element; and wherein the load spring element acts against a working direction of a volume change V2 of the working chamber of the slave cylinder.

11. The torsional vibration damping arrangement according to claim 1, wherein the rotational mass arrangement includes a damper subassembly, and wherein the damper subassembly is operatively connected to the primary inertia element or to the secondary inertia element.

12. The torsional vibration damping arrangement according to claim 5, wherein the energy storage is an elastically deformable element or a pneumatically compressible element.

* * * * *